United States Patent
Gateman et al.

(10) Patent No.: US 9,459,365 B2
(45) Date of Patent: Oct. 4, 2016

(54) APPARATUS AND METHODS FOR LOADING AND UNLOADING OF SENSOR CAPSULES

(71) Applicant: MAGSEIS AS, Lysaker (NO)

(72) Inventors: Jan Gateman, Bekkestua (NO); Eiven Undheim, Klepp Stasjon (NO)

(73) Assignee: MAGSEIS AS, Lysaker (NO)

( * ) Notice: Subject to any disclaimer, the term of this patent is extended or adjusted under 35 U.S.C. 154(b) by 0 days.

(21) Appl. No.: 14/647,255

(22) PCT Filed: Oct. 28, 2013

(86) PCT No.: PCT/NO2013/000049
§ 371 (c)(1),
(2) Date: May 26, 2015

(87) PCT Pub. No.: WO2014/084741
PCT Pub. Date: Jun. 5, 2014

(65) Prior Publication Data
US 2015/0301212 A1    Oct. 22, 2015

Related U.S. Application Data

(60) Provisional application No. 61/730,150, filed on Nov. 27, 2012.

(30) Foreign Application Priority Data

Nov. 27, 2012  (NO) .................................. 20121418

(51) Int. Cl.
*G01V 1/38* (2006.01)
*B63B 21/66* (2006.01)
*B63B 35/04* (2006.01)

(52) U.S. Cl.
CPC ............. *G01V 1/3843* (2013.01); *B63B 21/66* (2013.01); *B63B 35/04* (2013.01); *G01V 1/38* (2013.01)

(58) Field of Classification Search
CPC ........ B63B 35/04; B63B 21/66; G01V 1/38; G01V 1/3852; G01V 1/3843; G01V 1/201
USPC .............................. 405/158, 166, 168.3, 172
See application file for complete search history.

(56) References Cited

U.S. PATENT DOCUMENTS

| | | | | |
|---|---|---|---|---|
| 5,655,753 A | * | 8/1997 | Berges | B63B 35/04 254/134.3 SC |
| 5,902,072 A | * | 5/1999 | Berges | B63B 35/04 220/6 |

(Continued)

FOREIGN PATENT DOCUMENTS

| | | |
|---|---|---|
| CA | 2887400 | 4/2006 |
| GB | 2345683 | 7/2000 |
| WO | 2010/025283 | 3/2010 |
| WO | 2011/139159 | 11/2011 |

OTHER PUBLICATIONS

International Search Report issued in PCT/NO2013/000049, Feb. 13, 2014, pp. 1-3.

(Continued)

*Primary Examiner* — Benjamin Fiorello
*Assistant Examiner* — Carib Oquendo
(74) *Attorney, Agent, or Firm* — Jeffrey S. Melcher; Menelli Selter PLLC

(57) ABSTRACT

An apparatus and methods for loading and unloading of sensor capsules (9) into or out of seismic node casings (5) forming part of a seismic cable (19) to be deployed or retrieved by a vessel (18), the apparatus comprises: a trolley (3) with room for at least one sensor capsule (9), the trolley (3) is moveable back and forth in a direction essentially corresponding to the longitudinal direction (24, 25) of the seismic cable (19); a support structure (12) for the trolley (3); a latching mechanism (7) for latching the trolley (3) to a node casing (5), and at least one inserting/withdrawing mechanism (8, 11) for inserting and withdrawing the sensor capsules (9) into or out of the node casing (5).

16 Claims, 2 Drawing Sheets

(56) References Cited

U.S. PATENT DOCUMENTS

| | | | | |
|---|---|---|---|---|
| 6,070,857 A | * | 6/2000 | Dragsund | B65H 75/36 |
| | | | | 254/134.3 SC |
| 6,082,710 A | * | 7/2000 | Dragsund | B63B 35/04 |
| | | | | 254/134 |
| 8,087,848 B2 | * | 1/2012 | Thompson | B63B 21/66 |
| | | | | 405/166 |
| 2005/0052951 A1 | | 3/2005 | Ray et al. | |

OTHER PUBLICATIONS

Written Opinion issued in PCT/NO2013/000049, Feb. 12, 2014, pp. 1-3.

International Preliminary Report on Patentability issued in PCT/NO2013/000049, Feb. 13, 2014, pp. 1-3.

European Search Report issue3d in European Patent Application No. 13 85 9265, Jun. 15, 2016, pp. 1-6.

* cited by examiner

APPARATUS AND METHODS FOR LOADING AND UNLOADING OF SENSOR CAPSULES

INTRODUCTION

The present invention relates to the field of marine seismic exploration. More particularly, the invention relates to an apparatus and methods for loading and unloading of sensor capsules into or out of seismic node casings forming part of a seismic cable to be deployed or retrieved by a vessel.

BACKGROUND

In marine seismic exploration a seismic source emits sound waves which are reflected/refracted by interfaces between layers of the subsurface with different elastic properties. The amplitudes and arrival times of the returned sound waves are recorded by seismic sensors. Two main techniques are used to record the returned sound wave signals, one is by using hydrophone cables that are towed behind a vessel near the sea level, the other is to deploy seismic nodes at the ocean bottom. This invention relates to the latter technique.

After the seismic data has been recorded by the seismic nodes at the sea bottom, the seismic nodes are retrieved for transferring the seismic data to a data storage unit.

U.S. Pat. No. 8,050,140 discloses a system for collecting seismic data in marine environments by deploying multiple, continuous operating, wireless, self-contained ocean bottom sensor units or pods. The pods are attached to one another utilizing a flexible, non-rigid, non-conducting cable that is used to control deployment of the pods through the water. The pods are deployed and retrieved from the uniquely configured deck of a marine vessel, wherein the deck is provided with a conveyor system and a handling system to attach and detach individual pods from the non-rigid cable. In one embodiment, as part of the deck configuration, the individual pods are randomly stored in juke box fashion in slotted racks. When seated within the slot of a rack, the seismic data previously recorded by the pod can be retrieved and the pod can be charged, tested, re-synchronized, and operation can be re-initiated without the need to open the pod.

In the system of U.S. Pat. No. 8,050,140 and similar systems the seismic nodes or pods are stored in racks at the deck of the deploying/retrieving vessel. This takes up a lot of space and limits the number of seismic nodes that can be deployed at the sea bottom by the vessel.

To enable a vessel for deploying/retrieving seismic nodes to cover a larger area, and thereby reduce the cost for seismic exploration, there is a need for a technical solution that enables storing of a large number of seismic nodes at the deck of the deploying/retrieving vessel. The purpose of the invention is to provide this technical solution.

SUMMARY OF THE INVENTION

The invention provides an apparatus for loading and unloading of sensor capsules into or out of seismic node casings forming part of a seismic cable to be deployed or retrieved by a vessel. The apparatus comprises a trolley with room for at least one sensor capsule, the trolley is moveable back and forth in a direction essentially corresponding to the longitudinal direction of the seismic cable; a support structure for the trolley; a latching mechanism for latching the trolley to a node casing; and at least one inserting/withdrawing mechanism for inserting and withdrawing the sensor capsules into or out of the node casing.

The invention also provides a method for loading of sensor capsules into seismic node casings forming part of a seismic cable, during deployment of the seismic cable from a reel into the sea by a vessel, the method comprises:
 i) moving a trolley with an inserting/withdrawing mechanism for the sensor capsules to a reel-position;
 ii) supplying a sensor capsule to the inserting/withdrawing mechanism;
 iii) latching the trolley to a node casing;
 iv) inserting the sensor capsule into the node casing by the inserting/withdrawing mechanism while the seismic cable with the node casing and the trolley is moving towards the sea; and
 v) releasing the trolley from the node casing.

The invention also provides a method for unloading of sensor capsules from seismic node casings forming part of a seismic cable, during retrieval of the seismic cable from the sea onto a reel by a vessel. The method comprises:
 i) moving a trolley with an inserting/withdrawing mechanism for the sensor capsules to a sea-position;
 ii) latching the trolley to a node casing;
 iii) withdrawing a sensor capsule from the node casing by the inserting/withdrawing mechanism while the seismic cable with the node casing and the trolley is moving from the sea;
 iv) releasing the trolley from the node casing; and
 v) removing the sensor capsule from the inserting/withdrawing mechanism.

Preferred embodiments of the invention are specified in the dependent claims.

The seismic node casings form part of the seismic cable, and are stored on one or more cable reels. The sensor capsules are small compared to the size of the seismic node casings, and can be stored in a smaller space than the seismic nodes of prior art.

The invention provides an apparatus and methods which enable storing a large number of seismic node casings and sensor capsules on the deploying/retrieving vessel, and enable deploying and retrieving the seismic nodes in a quick and cost efficient way.

BRIEF DESCRIPTION OF DRAWINGS

Example embodiments of the invention will now be described with reference to the accompanying drawings, where.

DETAILED DESCRIPTION

Figure 1:
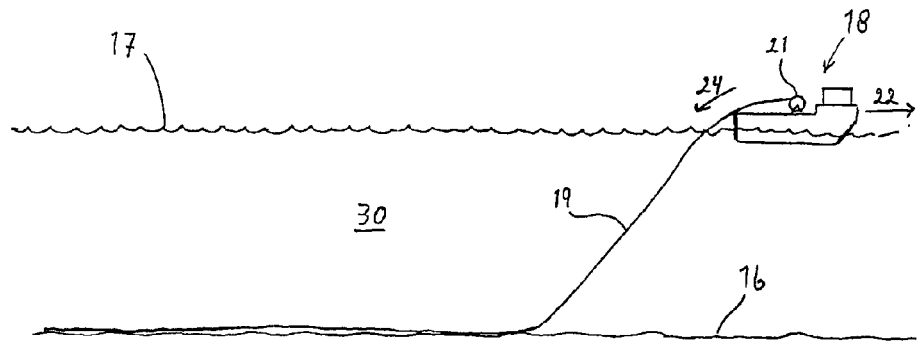
FIG. 1 illustrates a vessel deploying a seismic cable at the sea bottom.

The same reference numerals are used for the same or similar features in all the drawings and throughout the description.

Before explaining the invention, the context of its use will be explained.

FIG. 1 illustrates a vessel 18 floating in the sea 30 at the sea surface 17. The vessel moves in a direction 22 and deploys a seismic cable 19 at the sea bottom 16. The seismic cable 19 is unspooled from a reel 21 and deployed over the stern of the vessel in direction 24.

Figure 2:
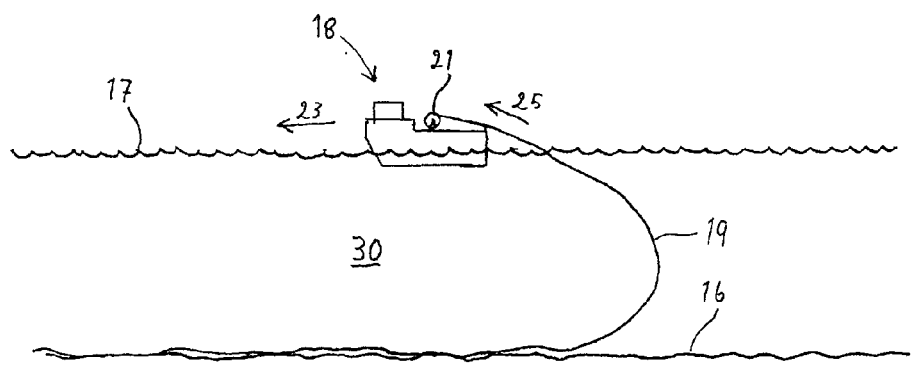
FIG. 2 illustrates a vessel retrieving a seismic cable from the sea bottom.

FIG. 2 illustrates the vessel 18 in FIG. 1 moving in a direction 23 and retrieving the seismic cable 19 from the sea bottom 16. The seismic cable 19 is retrieved over the stern of the vessel 18 and spooled onto the reel 21 in direction 25.

The seismic cable may be deployed and retrieved other places on the vessel, e.g. over the bow or side, and the invention is not limited to deploying/retrieving of the seismic cable at any particular place on the vessel.

Figure 3:
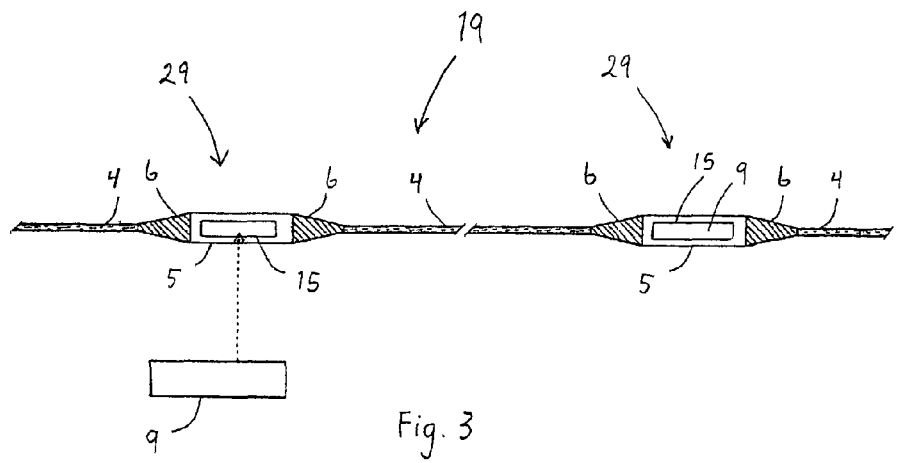
FIG. 3 illustrates a seismic cable.

FIG. 3 illustrates a seismic cable 19 of a kind used for the invention. The cable comprises autonomous seismic nodes 29 interconnected by stress members 4, in this embodiment formed by steel wire. Each seismic node 29 comprises a node casing 5 and a removable sensor capsule 9 located in an inner space 15 of the node casing The left side of FIG. 3 shows the sensor capsule 9 outside the inner space 15, while the right side of FIG. 3 shows the sensor capsule 9 inside the inner space 15. Each sensor capsule may comprise one or more not illustrated geophones, hydrophones, accelerometers, processors for executing program code, clocks, memories, movement sensors, temperature sensors, input/output means, power supplies, e.g. batteries, internal communication means and other components necessary to measure, register and store seismic signals. Acoustic decoupling arrangements 6 between the node casings 5 and the stress members 4 stop or reduce propagation of acoustic signals and noise between the seismic nodes 29.

When carrying out seismic exploration using the apparatus for loading and unloading of sensor capsules 9 into or out of seismic node casings 5 according to the invention, initially the node casings 5 are stored on one or more reels 21 as part of the seismic cable 19, and the sensor capsules 9 are stored in a suitable storage. The sensor capsules are loaded into the node casings by the apparatus of the invention while the seismic cable is on the vessel, during deployment of the seismic cable as explained with reference to FIG. 1. After deployment of the seismic cable one or more seismic sources, e.g. air guns, are fired, and acoustic signals propagate through the water and the ground, and are measured and stored by the seismic nodes. Then the seismic cable is retrieved as explained with reference to FIG. 2. At the vessel the sensor capsules 9 are unloaded from the node casings 5 by the apparatus of the invention. Then the sensor capsules are brought to one or more service stations for outputting of seismic data. Other activities carried out on the sensor capsules may be renewal or recharging of power supplies, e.g. batteries, reprogramming of processors, synchronization of clocks, calibration of clocks and sensors or renewal of the complete sensor capsule. When no service is carried out on the sensor capsules, they are kept in their storage.

Figure 4:
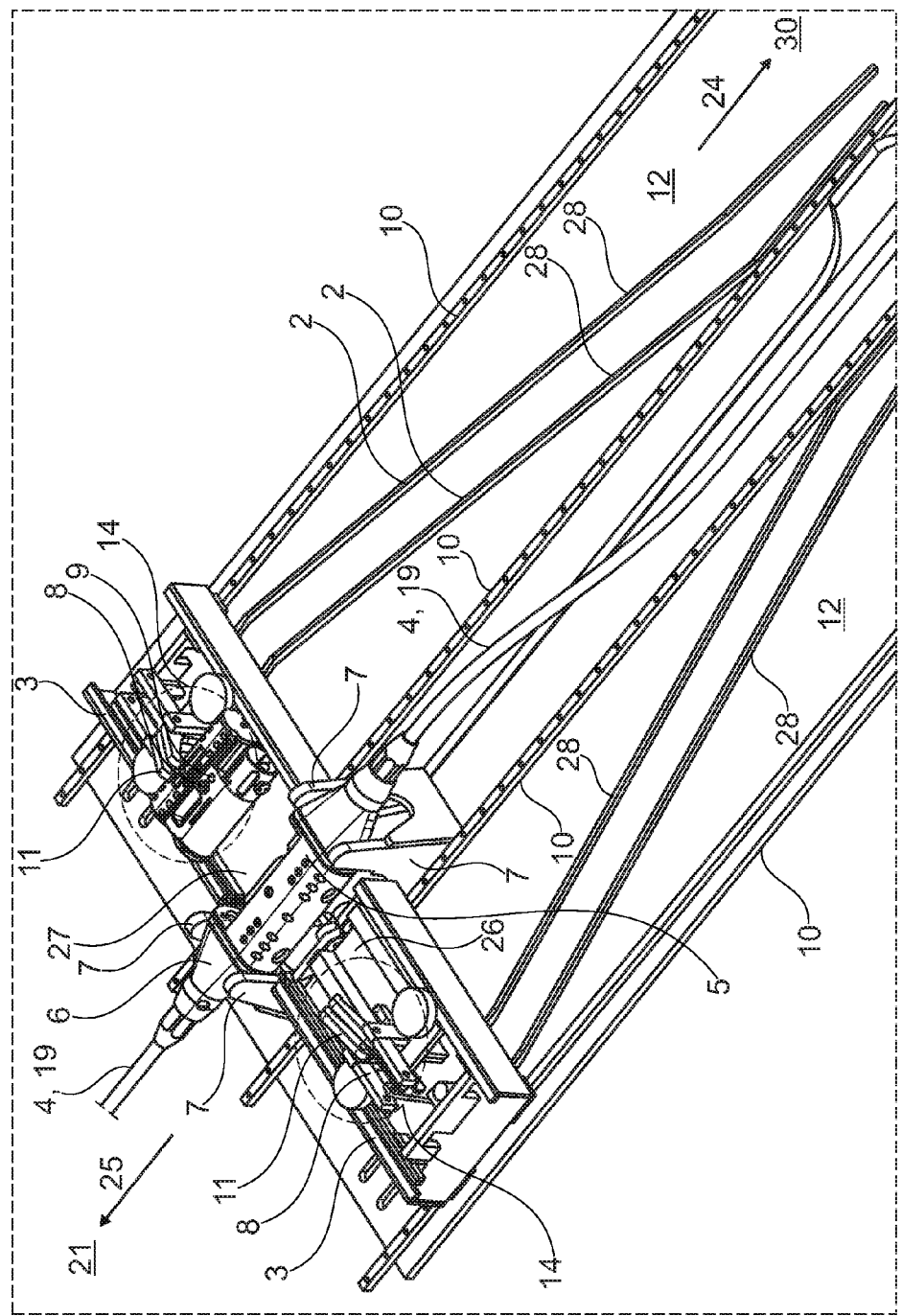
FIG. 4 illustrates an apparatus for loading and unloading of sensor capsules into or out of seismic node casings according to the invention.

FIG. 4 illustrates the apparatus for loading and unloading of sensor capsules 9 into or out of seismic node casings 5 according to the invention, located on a vessel as illustrated in FIGS. 1 and 2.

A seismic cable 19 of the kind illustrated in FIG. 3 is guided through the apparatus according to the invention by not illustrated means. The cable is either unspooled from the reel 21 in direction 24 for deployment into the sea 30, or spooled onto the reel 21 in direction 25 for retrieval from the sea 30. To ease in the explanation of the invention, "sea-side" of the apparatus shall mean the side of the apparatus where the seismic cable 19 goes down to the sea 30, and "reel-side" of the apparatus shall mean the side of the apparatus where the seismic cable goes to the reel 21.

The apparatus comprises a trolley 3 moveable back and forth in a direction essentially corresponding to the longitudinal direction 24, 25 of the seismic cable 19. The trolley is movable between a "sea-position", i.e. a position closest to the sea 30, and a "reel-position", i.e. a position closest to the reel 21, the latter position is illustrated in FIG. 4. The trolley can be moved by means of the seismic cable, or by means of not illustrated electromechanical, pneumatic or hydraulic means, or a spring.

The apparatus further comprises a support structure 12 for the trolley 3, which in the illustrated embodiment is a table. Alternatively the support structure may be a beam structure or plate structure. The support structure comprises guiding members 10 for guiding the trolley 3 in its movement. In the illustrated embodiment the guiding members are formed by four rails 10. Not illustrated stoppers limits the movement of the trolley 3 beyond the sea-position and reel-position.

The apparatus also comprises a latching mechanism for latching the trolley 3 to a node casing 5. The illustrated latching mechanism comprises two latch pins 7 on the "sea-side" of the trolley 3, i.e. the side of the trolley closest to the sea 30, and another two latch pins 7 on the "reel-side" of the trolley 3, i.e. the side of the trolley closest to the reel 21. The latch pins 7 are movable between a not illustrated retracted position and an extended position illustrated in FIG. 4. When the latch pins 7 are in the retracted position, the node casing 5 is free to move relative to the trolley 3 in the direction 24, 25. When the latch pins 7 are in the extended position, they grip the node casing 5 between them, and thereby latch the trolley 3 to the node casing 5, as illustrated in FIG. 4.

The illustrated trolley 3 has room for two sensor capsules 9, and comprises two inserting/withdrawing mechanisms, one for each sensor capsule 9, for inserting and withdrawing the sensor capsules into or out of the node casing 5. Only one sensor capsule 9, on the right side of the node casing 5, is visible in FIG. 4. Each inserting/withdrawing mechanism comprises an inner assembly 14, which in turn comprises a quick locking and release mechanism 8 with claws 11 for gripping/holding and inserting/withdrawing the sensor capsules 9. The quick locking and release mechanism 8 comprises a lug which is depressed when the claws 11 grip the sensor capsule and moves it into or out of the node casing.

It is seen from FIG. 4 that in a plane (not illustrated) transverse to the movement direction for the trolley, the latching mechanism is centrally located. A first room 26 for a sensor capsule 9 and a corresponding first inserting/withdrawing mechanism 8, 11 are located on a first, left side of the latching mechanism. Further a second room 27 for a sensor capsule 9 and a corresponding second inserting/withdrawing mechanism 8, 11 are located on a second, right side of the latching mechanism, opposite the first side of the latching mechanism. In FIG. 4, where the trolley 3 is in the reel-position, a sensor capsule 9 has been withdrawn from the node casing 5 by the second inserting/withdrawing mechanism 8, 11 on the right side of the node casing 5

When the seismic cable 19 is guided through the apparatus according to the invention, the entrance/exit to the inner space 15 of each node casing 5 is oriented facing one of the inserting/withdrawing mechanisms by not illustrated means. In the embodiment in FIG. 4 the entrance/exit to the inner space 15 is randomly oriented towards one of the inserting/withdrawing mechanisms. In other embodiments each node casing 5 could be guided to have the entrance/exit to the inner space 15 oriented towards the same inserting/withdrawing mechanism, the entrance/exit of every second node casing 5 could be oriented towards the first respectively second inserting/withdrawing mechanism, or any other way of guiding the node casings could be used. Not illustrated sensors and actuators ensure that the correct inserting/withdrawing mechanism is actuated.

The latching mechanism and inserting/withdrawing mechanisms may be actuated by electromechanical or pneumatic means, as well known to a person skilled in the art.

The support structure 12 comprises tracks 2 extending mainly in the movement direction for the trolley 3 Each track 2 has a portion 28 approaching the centre of the movement path for the trolley towards the sea-side of the apparatus. Thus the distance between tracks 2 on opposite sides of the cable widens towards the reel-side of the apparatus. Further each track 2 may have one or more portions parallel to the seismic cable 19, particularly in the end areas for the movement of the trolley 3.

The tracks 2 guide the inner assemblies 14 of the inserting/withdrawing mechanisms. When the trolley 3 is latched to the node casing 5 and moves from the reel-position to the sea-position, the tracks 2 force the inner assemblies 14 of the inserting/withdrawing mechanisms towards the node casing 5, to enable inserting a sensor capsule 9 into the node casing 5. Conversely, when the trolley 3 is latched to the node casing 5 and moves from the sea-position to the reel-position, the tracks force the inner assemblies 14 of the inserting/withdrawing mechanism away from the node casing 5, to enable withdrawing a sensor capsule 9 from the node casing 5.

Alternatively the movement of the inner assembly 14 of the inserting/withdrawing mechanism towards and away from the node casing 5 may be caused by electromechanical or pneumatic means The apparatus may also comprise a not illustrated robot for supplying and removing sensor capsules to/from the inserting/withdrawing mechanism 8, 11.

The invention also comprises a method for loading of sensor capsules 9 into seismic node casings 5 forming part of a seismic cable 19, during deployment of the seismic cable from a reel 21 into the sea 30 by a vessel 18

With reference to FIG. 4, the method comprises the following steps:

i) Moving a trolley 3 with an inserting/withdrawing mechanism 8, 11, 14 for the sensor capsules 9 to a reel-position. This can be done by electromechanical, pneumatic or hydraulic means, or a spring.

ii) Supplying a sensor capsule 9 to the inserting/withdrawing mechanism 8, 11, 14. Preferably this is done by a robot iii) Latching the trolley 3 to a node casing 5. This can be done by moving the two latch pins 7 on the sea-side of the trolley from the retracted position to the extended position. The seismic cable is moving in direction 24, and a node casing 5 will hit said latch pins 7 and drag the trolley 3 in direction 24. This may trigger a mechanism to move the two latch pins 7 on the reel-side of the trolley from the retracted position to the extended position. The latch pins 7 thereby latch the trolley 3 to the node casing 5.

iv) Inserting the sensor capsule 9 into the node casing 5 by the inserting/withdrawing mechanism 8, 11, 14 while the seismic cable 19 with the node casing 5 and the trolley 3 is moving towards the sea 30. Preferably the inserting of the sensor capsule 9 is guided by a track 2.

v) Releasing the trolley 3 from the node casing 5. This can be done by moving the latch pins 7 from the extended position to the retracted position.

The apparatus is now ready for a new sequence of the method.

In the above method a sensor capsule 9 is supplied to the inserting/withdrawing mechanism while the trolley 3 is in the reel-position. Alternatively, the sensor capsule 9 could be supplied to the inserting/withdrawing mechanism while the trolley 3 is in the sea-position, or any position between the reel-position and the sea-position. Thus the invention is not dependent upon when step ii) is carried out in the sequence of steps.

The invention also comprises a method for unloading of sensor capsules 9 from seismic node casings 5 forming part of a seismic cable 19, during retrieval of the seismic cable from the sea 30 onto a reel 21 by a vessel 18.

With reference to FIG. 4, the method comprises the following steps i) Moving a trolley 3 with an inserting/withdrawing mechanism 8, 11, 14 for the sensor capsules 9 to a sea-position. This can be done by electromechanical, pneumatic or hydraulic means, or a spring ii) Latching the trolley 3 to a node casing 5. This can be done by moving the two latch pins 7 on the reel-side of the trolley from the retracted position to the extended position. The seismic cable is moving in direction 25, and a node casing 5 will hit said latch pins 7 and drag the trolley 3 in direction 25. This may trigger a mechanism to move the two latch pins 7 on the sea-side of the trolley from the retracted position to the extended position. The latch pins 7 thereby latch the trolley 3 to the node casing 5.

iii) Withdrawing a sensor capsule 9 from the node casing 5 by the inserting/withdrawing mechanism 8, 11, 14 while the seismic cable 19 with the node casing 5 and the trolley 3 is moving from the sea 30 Preferably the withdrawing of the sensor capsule 9 is guided by a track 2.

iv) Releasing the trolley 3 from the node casing 5. This can be done by moving the latch pins 7 from the extended position to the retracted position.

v) Removing the sensor capsule 9 from the inserting/withdrawing mechanism 8, 11, 14. Preferably this is done by a robot.

In the above method the sensor capsule 9 may be removed from the inserting/withdrawing mechanism while the trolley 3 is in the reel-position. Alternatively, the sensor capsule 9 could be removed from the inserting/withdrawing mechanism while the trolley 3 is in the sea-position, or any position between the reel-position and the sea-position. Thus the invention is not dependent upon when step v) is carried out in the sequence of steps.

The invention claimed is:
1. An apparatus for attaching or detaching a sensor capsule to and from a running seismic cable on a vessel, wherein the apparatus comprises:
a trolley with at least one room for a sensor capsule, wherein the trolley is moveable back and forth on a support structure in a longitudinal direction essentially corresponding to the longitudinal direction of the seismic cable during deployment and retrieval;
a latching mechanism for latching the trolley temporarily to a node casing forming part of the seismic cable; and
at least one inserting/withdrawing mechanism for inserting and withdrawing the sensor capsule into or out of the node casing while the trolley is latched to the node casing.

2. The apparatus of claim 1, wherein the latching mechanism is centrally located at the seismic cable and the room for the sensor capsule and a corresponding inserting/withdrawing mechanism is located at a distance from the latching mechanism in a lateral direction perpendicular to the longitudinal direction.

3. The apparatus of claim 2, wherein the trolley comprises a first room on a first side of the latching mechanism and a second room on the opposite side of the latching mechanism.

4. The apparatus of claim 2, wherein the inserting/withdrawing mechanism is movable back and forth on the trolley in the lateral direction.

5. The apparatus of claim 3, wherein the inserting/withdrawing mechanism is movable back and forth on the trolley in the lateral direction.

6. The apparatus of claim 4, wherein the support structure comprises a track extending in the longitudinal direction and configured for guiding the inserting/withdrawing mechanism in the lateral direction toward the seismic cable during deployment and away from the seismic cable during retrieval.

7. The apparatus of claim 6, wherein the track has an end that extends parallel to the seismic cable.

8. The apparatus of claim 4, wherein the inserting/withdrawing mechanism is moved in the lateral direction by electromechanical or pneumatic means.

9. The apparatus of claim 1, wherein the latching mechanism comprises at least one latch pin that is movable between a retracted position where the trolley is free relative to the node casing, and an extended position for latching the trolley to the node casing.

10. The apparatus of claim 1, further comprising a robot for supplying and removing sensor capsules to/from the inserting/withdrawing mechanism.

11. A method for attaching sensor capsules to a running seismic cable on a vessel, during deployment of the seismic cable from a reel into the sea, wherein the method comprises:
   i) moving a trolley with an inserting/withdrawing mechanism for the sensor capsules to a reel-position;
   ii) supplying a sensor capsule to the inserting/withdrawing mechanism;
   iii) latching the trolley to a node casing forming part of the seismic cable;
   iv) inserting the sensor capsule into the node casing by the inserting/withdrawing mechanism while the seismic cable with the node casing and the trolley is moving towards the sea; and
   v) releasing the trolley from the node casing.

12. The method of claim 11, wherein inserting the sensor capsule into the node casing comprises using a track for guiding the inserting/withdrawing mechanism in a lateral direction toward the seismic cable while the trolley is moving toward the sea.

13. The method of claim 11, wherein supplying the sensor capsule to the inserting/withdrawing mechanism is carried out by a robot.

14. A method for detaching sensor capsules a running seismic cable on a vessel during retrieval of the seismic cable from the sea onto a reel, wherein the method comprises:
   i) moving a trolley with an inserting/withdrawing mechanism for the sensor capsules to a sea-position;
   ii) latching the trolley to a node casing forming part of the seismic cable;
   iii) withdrawing a sensor capsule from the node casing by the inserting/withdrawing mechanism while the seismic cable with the node casing and the trolley is moving from the sea;
   iv) releasing the trolley from the node casing; and
   v) removing the sensor capsule from the inserting/withdrawing mechanism.

15. The method of claim 14, wherein withdrawing the sensor capsule from the node casing comprises using a track for guiding the inserting/withdrawing mechanism in a lateral direction away from the seismic cable while the trolley is moving away from the sea.

16. The method of claim 14, wherein removing the sensor capsule from the inserting/withdrawing mechanism is carried out by a robot.

* * * * *